June 4, 1957 M. D. INDJOUDJIAN 2,794,927

ELECTRIC PULSE SHAPING NETWORK

Filed Dec. 13, 1954 2 Sheets-Sheet 1

2,794,927

ELECTRIC PULSE SHAPING NETWORK

Mardiros Dickran Indjoudjian, Vincennes, France

Application December 13, 1954, Serial No. 474,720
Claims priority, application France December 22, 1953
7 Claims. (Cl. 307—106)

The present invention relates to a pulse shaping network, the purpose of which is, when a short unidirectional electric pulse is applied to the input terminals of said network, to deliver at the latter's output terminals a transformed pulse having a well-defined wave-shape, the instantaneous amplitude of which may be represented in rectangular coordinates as a function of time, by a Gaussian bell-shaped curve.

It is well known that an advantage of a pulse having this wave-shape is that the frequency band covered by its spectrum is comparatively narrow, for a given overall duration of the said pulse. For this reason, it is often desirable to transform pulses of arbitrary wave-shape into pulses having the above mentioned wave shape to allow them to be transmitted through channels of moderate frequency bandwith.

In the method of the present invention, the desired transformation is accomplished by means of a ladder network, comprised of series inductances and shunt condensers, and having a non-iterative structure; i. e. every inductance or condenser in the network has a different value, their successive values decreasing (or increasing) from one end of the network to the other, and the values of the said inductances and condensers being defined as functions of their rank in the network and in relation with those of its termination impedances, which are always assumed to be purely resistive.

It is now obvious that such a network can be built from physically realizable elements. It is a part of the present invention that it may effectively be built, and than in fact this may be done for arbitrary resistive terminations values.

Although the networks of the invention are specifically designated for pulse operation, it has been found convenient to describe their method of designing by starting from their properties in a periodic and sinusoidal condition. That is to say, their properties will be specified in connection with an ideal source of electromotive force of angular frequency $\varpi$, connected at their input terminals and having an internal resistance of value $R_1$, and an ideal load resistance of value $R_2$ connected at their output terminals. A time constant closely related to the duration of the pulses it is desired to obtain at the output of the network will be designated as $\tau$, while $j$ will designate, as usual, the imaginary ($j_2=l$). An auxiliary complex variable, equal to the product of $j$ by $\varpi$ and $\tau$ will be denoted by $p$.

It is well known that, when the transmission properties of a network are known for any frequency in the periodic sinusoidal condition, its transient properties may be calculated with the help of Fourier integrals and transforms.

Conventionally, I shall call "transfer function of the network" a quantity which is equal, except for a constant factor, to the ratio of the electromotive force or current applied at the input to the network, to the voltage or current at the output from said network.

It will also be agreed to take as an impedance unit a resistance value R which is, as the case may be, the value of the internal resistance of the signal source connected to the input to the network or that of the load impedance connected to the output from the network. The values of the network elements, inductances and condensers will be specified by numerical quantities designated "$a_k$" or "$b_k$," which will be the values of their reactances or admittances at the frequency $\varpi_0=l/\tau$, respectively divided or multiplied by that of R, the subscript $k$ corresponding to the rank of the element from the input to the network.

According to the present invention, there is provided a pulse shaping, ladder-type network comprising a total number $n$ of inductances in series and of condensers in shunt, characterized in that the respective values of said inductances and condensers are so dimensioned that with a periodic condition of angular frequency $\varpi$ the ratio of an electromotive force or current applied to the input to said network to the current or voltage received at the output from said network, is equal to the product of a constant factor by $$\theta_n(p)=\left(1+\frac{p}{\sqrt{n}}\right)^n$$

designating by $p$ the product $j\varpi\tau$, where $j$ is the imaginary unit and $\tau$ an arbitrarily chosen time constant. In one mode of embodiment, the network constituted of $n$ elements comprises $$\frac{n}{2}$$

L-type sections where $n$ is even; in another mode of embodiment, when $n$ is odd, it comprises an additional element which is either a shunt condenser in one type of network or a series inductance in the type of network derived from the previous one by duality, a transformation well known in the theory of ladder networks.

It can be shown that, for increasing values of $n$, the wave shape of the signals received after the network when short pulses are applied at its input, tends towards a Gaussian bell-shaped curve. This is due to the fact that, for the sinusoidal condition, the shape of the response curve of the network as a function of frequency is also substantially similar to a bell-shaped curve, even for low values of $n$. As it is known in analysis that a time-function represented by a Gaussian bell-shaped curve is, except for a constant numerical factor, its own Fourier transform, and that the above-given function $\theta_n(p)$, tends for large values of $n$, toward $$e^{\frac{p^2}{2}+p\sqrt{n}}$$

it is obvious that the response of the network to a unit impulse applied at its input (see, for instance G. Campbell "Practical Application of the Fourier Integral," Bell System Technical Journal, October 1928, p. 677), will be represented by a time function of the form $$e^{-\frac{t^2}{2}}$$

(the term $p\sqrt{n}$ may be neglected as it only introduces a delay time proportional to $\sqrt{n}$, and in fact equal to $\tau\sqrt{n}$), $\tau$ being taken as the time unit for $t$. The result is that a pulse, having a very short duration, applied at the input to the network, produces, at the output, a pulse having the wave shape of a bell-shaped curve, of the Gaussian type, the instantaneous amplitude of which is substantially represented by the function:

$$\psi(t)=\frac{1}{\sqrt{2\pi}}e^{-\frac{t_2}{2}}$$

By "short pulse" is meant a pulse the duration of which, measured between the instants when its instantaneous amplitude is half its maximum amplitude is definitely less than the reciprocal of the width of the frequency band in which the network attenuation is lesser than 6 decibels, whatever may be, otherwise, the wave shape of that pulse.

The network of the invention can be determined entirely for any resistive terminations, but two cases are of great practical interest. In the first one, the source and the utilization impedance or load have the same resistance. In the second one, the source has a finite resistance and the load an infinite impedance, or vice versa. In both cases the values of the network elements are calculated, taking as a resistance unit the value R or $R_1$ of the terminating resistance or resistances which are not infinite, i. e. the values found are reduced reactances.

The invention will be better understood from the detailed description which will now be given, with reference to the appended drawings, wherein.

Figure 1:
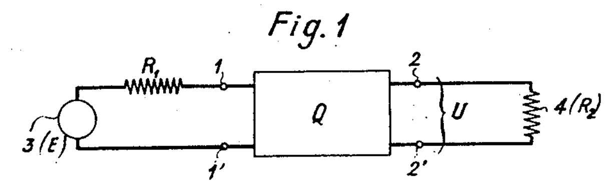
Figure 1 represents the network of the invention inserted between a source and a load having respectively resistances $R_1$ and $R_2$.

In all figures representing the networks, the input terminals thereof are designated by 1—1′ and the output terminals by 2—2′.

The electrical properties of the networks, the transfer functions of which meet the above mentioned condition will now be made clear, and their method of construction will be described thereafter.

As already mentioned, the transfer function of the network comprising $n$ elements is taken equal to $$\theta_n(p)=\left(1+\frac{p}{\sqrt{n}}\right)^n \qquad (1)$$

When (Fig. 1) the network Q is inserted between a voltage source 3 having an internal resistance $R_1$ and a load 4, having a resistance $R_2$, the transfer function $\theta(p)$ is defined by the quotient:

$$\frac{E}{U}\frac{R^2}{R_1+R_2}$$

where $E.e^{pt}$ is the electromotive force at the input and where the output voltage is $Ue^{pt}$, E and U being complex numbers.

When (Fig. 2) the network Q is inserted between a voltage source 5 having an internal resistance R and a load 6 having an infinite impedance, the transfer function $\theta(p)$ is defined by the quotient:

$$\frac{E}{U}$$

of the input electromotive force and the output voltage.

When (Fig. 3) the network Q is inserted between a current source 7 with an infinite internal impedance and a load 8 having a resistance R, the transfer function $\theta(p)$ is defined by the quotient:

$$\frac{RI}{U}$$

where I is the input current.

The case of Figure 3 will not be separated, hereinafter, from the case of Figure 2 as, the elements of the network Q of Figure 2 having been calculated, it will be sufficient to turn the figure over, end to end, the terminals 2—2′ being connected with the current generator of infinite impedance and the terminals 1—1′ to the load resistance R for obtaining a network Q having the transfer function $\theta_n(p)$ in the sense of Figure 2.

To sum up, the network elements can be calculated for three hypotheses:

The network is inserted between arbitrary resistances $R_1$ and $R_2$.

The network is inserted between equal source and load impedances.

The network is inserted between a source of finite resistance and a load of infinite impedance.

The values of the inductances and capacitances in the network for various resistive terminations, can, of course, be calculated by numerical approximation. However, to avoid imposing upon the man of the art a tedious work, a direct method of calculation will be given hereinafter. For most practical purposes these values may also be calculated from the numerical Tables I to III given at the end of the present specification.

Figure 2:
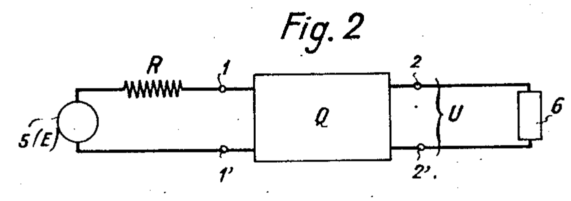
Figure 2 represents this same network inserted between a source having a finite resistance and a load having an infinite impedance.
Figure 3:
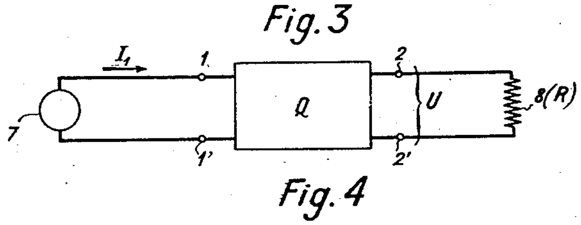
Figure 3 represents this same network inserted between a current source having an infinite impedance and a load having a finite resistance.
Figure 4:
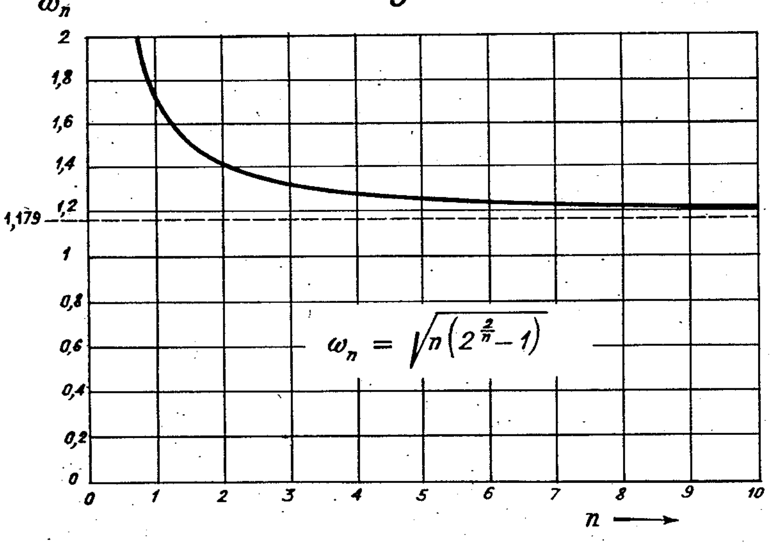
Figure 4 is a curve which gives the "band width at 6 db" attenuation, for the network, as a function of $n$.
Figure 5:
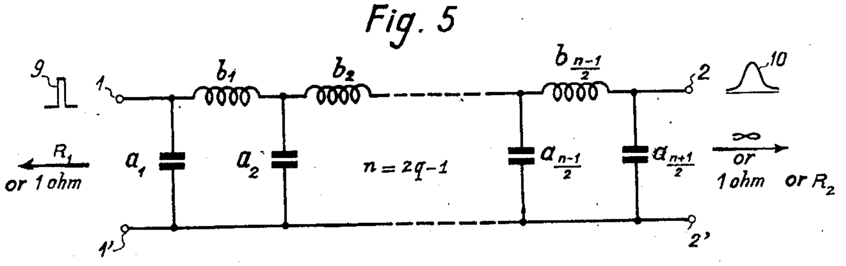
Figures 5 to 8 represent, diagrammatically, networks in accordance with the invention.
Figure 6:
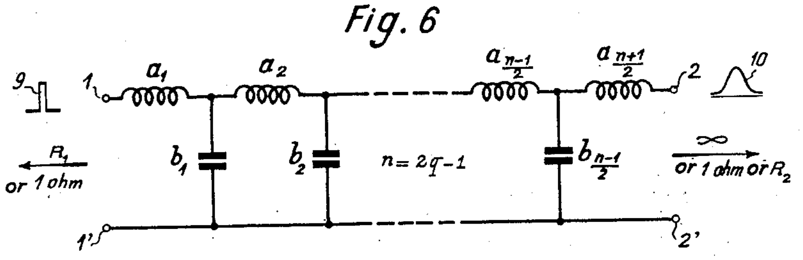

In the case of Figure 2, where the load impedance is infinite, the values of the elements of the ladder type network are given as general formulae by Table I and as numerical values up to $n=9$ in Table II. The corresponding networks are represented in Figures 5 and 6 for the case in which $n$ is odd, and in Figures 7 and 8 for the case in which $n$ is even. The network of Figure 6 is derived by duality from the network of Figure 5 and similarly the network of Figure 8 is derived by duality from the network of Figure 7. In each one of Figures 5 to 8, 9 designates a short input pulse and 10 an output pulse in the shape of a Gaussian bell-type curve. Table III gives the values of the $a$'s and $b$'s in the case of equal resistive terminations of resistance R. In every case the actual values of the inductances should be calculated by multiplying the corresponding coefficients $a$ or $b$ by $R_1/\omega_0$, wherein $\omega_0$ equals $1/\tau$, and those of the capacities of the condensers by dividing the corresponding coefficients by the product $\omega_0 R_1$, $R_1$ being the smaller of the two terminating resistances $R_1$ and $R_2$.

It has been found that the network comprises inductances in series and condensers, in shunt, which results, obviously, from the fact that $\theta_n(p)$ is a polynomial. For an even value of $n$, the network comprises $$\frac{n}{2}$$

Figure 7:
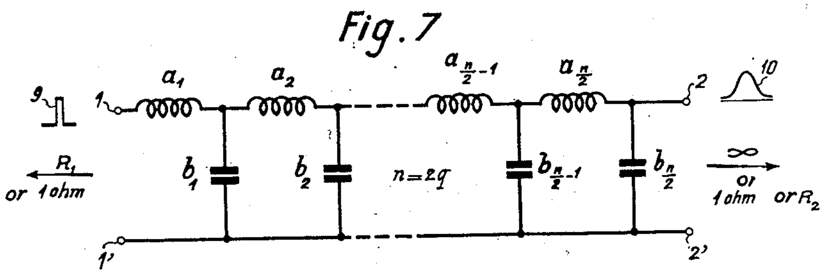
Figure 8:
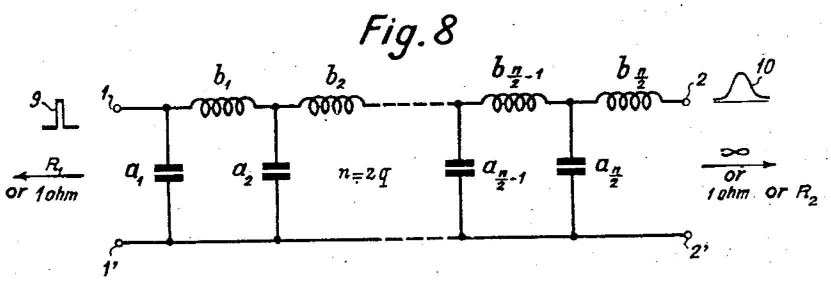

L type sections, the $a$'s being the values of the series inductances and the $b$'s the capacitances of the shunt condensers for the network of Figure 7 and the functions of the $a$'s and $b$'s being reversed for the case of the network of Figure 6. For an odd value of $n$, the network comprises $$\frac{n-1}{2}$$

L-sections, and an additional shunt condenser in the case of Figure 5 and an additional series inductance in the case of Figure 6. The $a$'s are the capacitances of the shunt condensers and the $b$'s the value of the series inductances for the network of Figure 5 and the functions of the $a$'s and $b$'s are reversed in the case of the network of Figure 6.

In all cases, the number of elements in the network should be equal to $n$, in order to have a transfer function equal to $\theta_n(p)$. The above mentioned direct calculation method for calculating the coefficients $a$'s and $b$'s will now be explained.

For the case of an infinite output impedance their values are obtained by forming the ratio:

$$\frac{\text{Even portion of } \theta_n(p)}{\text{Odd portion of } \theta_n(p)}$$

and developing into a continuous fraction, on the one hand, this ratio, and, on the other hand, the algebraic expression of the input impedance of the network referred to unit angular frequency $\omega_0$ (equalling $1/\tau$) and to unit resistance $R_1$, and identifying the terms of the same rank in these two developments. For instance, if $n=3$ and if $z_{11}(p)$ is the reduced input impedance of the network, one may write, on the one hand:

$$\frac{p^3\frac{\sqrt{3}}{9}+p\sqrt{3}}{p^2+1}=\frac{\sqrt{3}}{9}p+\cfrac{1}{\frac{3\sqrt{3}}{8}p+\cfrac{1}{\frac{8\sqrt{3}}{9}p}} \quad (2)$$

and, on the other hand (Figure 5):

$$\frac{1}{z_{11}(p)}=a_1p+\cfrac{1}{b_1p+\cfrac{1}{a_2p}} \quad (3)$$

Identifying Formulae 7 and 8 there is obtained:

$$a_1=\frac{\sqrt{3}}{9}=0.192$$

$$b_1=\frac{3\sqrt{3}}{8}=0.649$$

$$a_2=\frac{8\sqrt{3}}{9}=1.540$$

If, in the case of Figure 1, the resistances of the load and source are assumed to be both equal to unity, the numerical values of the network elements are given up to $n=6$ in the appended Table III.

As already mentioned, it has also been found that it is possible to realize networks having the same properties, built in a similar manner and which can be inserted between two arbitrary resistances $R_1$ and $R_2$.

The mode of calculation of the elements of such networks will be indicated hereinafter, assuming $R_1$ to be smaller than $R_2$, assuming that $R_1$ is the internal resistance of the source and $R_2$ that of the load circuit and designating by $\lambda$ the quantity:

$$\frac{2\sqrt{R_1R_2}}{R_1+R_2} \quad (4)$$

It is always possible to come back to the particular case contemplated by interchanging, if necessary, the functions of the load circuit and of the source as allowed by Lord Rayleigh's "Reciprocity Theorem."

In these conditions, the ratio of the electromotive force E applied at the input to the network to the voltage U present at the terminals of the load circuit is equal to:

$$\frac{E}{U}=\frac{R_1+R_2}{R_2}\left(1+\frac{p}{\sqrt{n}}\right)^n$$

It was found that with the above condition, the calculation of the network elements can be effected by a method similar to that set forth in the above mentioned patent application for the case of arbitrary resistances $R_1$ and $R_2$.

To this effect, designating by $\theta'(p)$ and $\theta''_n(p)$ the odd and even portions of the polynomial $\theta_n(p)$, a polynomial $S_n(p)$ is formed such that $$S_n(p)S_n(-p)=\theta_n(p)\theta_n(-p)-\lambda^2 \quad (5)$$

Putting, similarly:

$$S_n(p)=S_n'(p)+S_n''(p) \quad (6)$$

where $S_n'(p)$ is the odd portion and $S_n''(p)$ the even portion of $S_n(p)$ according to that one of the four possible cases corresponding to Figures 5 to 8 one of the quantities $H_1'(p)$, $H_1''(p)$; $H_2'(p)$, $H_2''(p)$ defined hereinafter should be calculated:

(1) $n$ is odd, and it is desired to obtain a network of the type of Figure 5, i. e. terminated at both ends by a condenser.

In this case, the expression is formed $$\frac{1}{H_1'(p)}=\frac{\theta''_n(p)-S''_n(p)}{\theta'_n(p)+S'_n(p)} \quad (7)$$

It can be shown that $H_1'(p)$ is equal to the product of the reciprocal of the network input impedance, measured with its output terminals open-circuited, by the value of $R_1$. Thus:

$$H'_1(p)=a_1p+\cfrac{1}{b_1p+\cfrac{1}{a_2p+\cfrac{1}{b_2p+\ldots\ldots+\cfrac{1}{b_{\frac{n-1}{2}}p+\cfrac{1}{a_{\frac{n+1}{2}}p}}}}}$$

The values of the condenser capacities are then obtained by dividing the $a$ coefficients by $\omega_0R_1$, and those of the inductances by multiplying the $b$ coefficients by $R_1/\omega_0$.

(2) $n$ is odd, and it is desired to obtain a network of the type of Figure 6, i. e. terminated at each end into an inductance.

In this case, $H_1'(p)$ is calculated as previously, but, for calculating the values of the inductances and of the condenser capacities, the values of the quantities $a$ and $b$ are interchanged and $R_1$ is replaced by $R_2$.

(3) $n$ is even, and it is desired to obtain a network of the type of Figure 7, i. e. beginning, on the source side by an inductance and terminating, on the load circuit side, into a condenser.

In this case, the expression is formed:

$$H''_1(p)=\frac{\theta''_n(p)+S''_n(p)}{\theta'_n(p)-S'_n(p)} \quad (8)$$

It can be shown that this expression is equal to the quotient of the input impedance of the network measured with its output terminals in open circuit by the value of $R_1$. Thus:

$$H''_1(p)=a_1p+\cfrac{1}{b_1p+\cfrac{1}{a_2p+\cfrac{1}{b_2p+\ldots\ldots\ldots+\cfrac{1}{a_{\frac{n}{2}}p+\cfrac{1}{b_{\frac{n}{2}}p}}}}}$$

The condenser values are then obtained by dividing the $b$ coefficients by $\omega_0R_1$ and those of the inductances by multiplying the $a$ coefficients by $R_1/\omega_0$.

(4) $n$ is even and it is desired to obtain a network of the type of Figure 8, i. e. beginning, on the source side, by a condenser, and terminating, on the load circuit side, into an inductance.

In this case, $H''_1(p)$ is calculated as in (3) but, for calculating the values of the inductances and condensers, the values of the quantities $a$ and $b$ are interchanged and $R_1$ is replaced by $R_2$.

Of course, one modification of the above calculation is possible, for determining the inductances and condensers, by starting from the output resistance $R_2$ of the network instead of the input resistance $R_1$. In this case, expressions are formed, $H'_2(p)$ and $H''_2(p)$ similar to $H'_1(p)$ and $H''_1(p)$ as follows:

$$\frac{1}{H'_2(p)}=\frac{\theta''_n(p)+S''_n(p)}{\theta'_n(p)+S'_n(p)}\ (n\text{ odd}) \quad (9)$$

$$H''_2(p)=\frac{\theta''_n(p)+S''_n(p)}{\theta'_n(p)+S'_n(p)}\ (n\text{ even}) \quad (10)$$

The calculation is carried out in the same manner but replacing $R_1$ by $R_2$ and vice versa. It should be noted that in this case the order of the subscripts of the $a$ and $b$ quantities is interchanged and that, for the case of $n$ odd, the first term of development into a continuous fraction will thus have a subscript $$\frac{n+1}{2}$$

and, in the case of $n$ even, the subscript $$\frac{n}{2}$$

In the case of the networks of Figures 5 and 6 in the main patent, the development of $H'_2(p)$ begins with a term in $$a_{\frac{n+1}{2}}$$

and in the case of the networks of Figures 7 and 8 the first term of the development of $H''_2(p)$ will be a term in $$b_{\frac{n}{2}}$$

It was also found that in the case where $R_1$ is different from $R_2$, like the one already set forth in the main patent, where $R_1$ and $R_2$ are equal and have the same value R it is possible to express the polynomials $S_n(p)$ explicitly.

In the general case, letting, as already mentioned:

$$\lambda=\frac{2\sqrt{R_1R_2}}{R_1+R_2}$$

and setting also $$\frac{p}{\sqrt{n}}=x \text{ and } \mu=\sqrt[n]{\lambda^2}$$

and $$\Delta=1-2\mu\cos\frac{2k\pi}{n}+\mu^2$$

where $k$ is a summation subscript, it was found that:

(1) In case $n$ is odd:

$$S_n(p)=(x+\sqrt{1-\mu})\prod_{k=1}^{\frac{n-1}{2}}\left(x^2+x\sqrt{2-2\mu\cos\frac{2k\pi}{n}+2\sqrt{\Delta}}+\sqrt{\Delta}\right) \quad (11)$$

(2) In case $n$ is even:

$$S_n(p)=(x+\sqrt{1-\mu})(x+\sqrt{1+\mu})\prod_{k=1}^{\frac{n}{2}-1}\left(x^2+x\sqrt{2-2\mu\cos\frac{2k\pi}{n}+2\sqrt{\Delta}}+\sqrt{\Delta}\right) \quad (12)$$

When $R_1=R_2$, Formulae 16 and 17 simplify as follows:

(1) In case $n$ is odd:

$$S_n(p)=x\prod_{k=1}^{\frac{n-1}{2}}\left(x^2+2x\sin\left(\frac{k\pi}{2n}+\frac{\pi}{4}\right)\sqrt{2\sin\frac{k\pi}{n}}+2\sin\frac{k\pi}{n}\right) \quad (11')$$

(2) In case $n$ is even:

$$S_n(p)=x(x+\sqrt{2})\prod_{k=1}^{\frac{n}{2}-1}\left(x^2+2x\sin\left(\frac{k\pi}{n}+\frac{\pi}{4}\right)\sqrt{2\sin\frac{k\pi}{n}}+2\sin\frac{k\pi}{n}\right) \quad (12')$$

A second solution for the network may also be obtained by replacing, in the expressions for $H'_1(p)$, $H''_1(p)$, $H'_2(p)$ and $H''_2(p)$ the quantity $S''(p)$ by $-S''(p)$ in case $n$ is odd, or the quantity $S'(p)$ by $-S'(p)$ in case $n$ is even. The calculations are carried out for the rest in the same manner as in the cases contemplated above.

The following Tables I and II respectively give, for the case of an infinite output impedance formulae for calculating the values of the coefficients $a$'s and $b$'s and their numerical values up to $n=9$. Table III similarly gives the values of the coefficients for equal resistance terminations and up to $n=6$.

*Table I*

$$a_1=\frac{\sqrt{n}}{n^2}$$

$$b_1=\frac{3\sqrt{n}}{n^2-1}$$

$$a_2=\frac{5(n^2-1)}{n^2(n^2-4)}\sqrt{n}$$

$$b_2=\frac{7(n^2-4)}{(n^2-1)(n^2-9)}\sqrt{n}$$

$$a_3=\frac{9(n^2-1)(n^2-9)}{n^2(n^2-4)(n^2-16)}\sqrt{n}$$

$$b_3=\frac{11(n^2-4)(n^2-16)}{(n^2-1)(n^2-9)(n^2-25)}\sqrt{n}$$

$$a_k=\frac{(4k-3)(n^2-1)(n^2-9)\ldots[n^2-(2k-3)^2]}{n^2(n^2-4)(n^2-16)\ldots[n^2-(2k-2)^2]}\sqrt{n}$$

$$b_k=\frac{(4k-1)(n^2-4)(n^2-16)\ldots[n^2-(2k-2)^2]}{(n^2-1)(n^2-9)(n^2-25)\ldots[n^2-(2k-1)^2]}\sqrt{n}$$

$$n=2q-1\begin{cases}a_{\frac{n+1}{2}}=\dfrac{(2n-1)(n^2-1)(n^2-9)\ldots4(n-1)}{n^2(n^2-4)(n^2-16)\ldots(2n-1)}\sqrt{n}\\[2ex] b_{\frac{n-1}{2}}=\dfrac{(2n-3)(n^2-4)(n^2-16)\ldots3(n-3)}{(n^2-1)(n^2-9)(n^2-25)\ldots4(n-1)}\sqrt{n}\end{cases}$$

$$n=2q\begin{cases}a_{\frac{n}{2}}=\dfrac{(2n-3)(n^2-1)(n^2-9)\ldots3(n-3)}{n^2(n^2-4)(n^2-16)\ldots4(n-1)}\sqrt{n}\\[2ex] b_{\frac{n}{2}}=\dfrac{(2n-1)(n^2-4)(n^2-16)\ldots4(n-1)}{(n^2-1)(n^2-9)(n^2-25)\ldots(2n-1)}\sqrt{n}\end{cases}$$

*Table II*

| $n$ | $a_1$ | $b_1$ | $a_2$ | $b_2$ | $a_3$ | $b_3$ | $a_4$ | $b_4$ | $a_5$ |
|---|---|---|---|---|---|---|---|---|---|
| 1 | 1.000 | ------ | ------ | ------ | ------ | ------ | ------ | ------ | ------ |
| 2 | 0.353 | 1.414 | ------ | ------ | ------ | ------ | ------ | ------ | ------ |
| 3 | 0.192 | 0.649 | 1.540 | ------ | ------ | ------ | ------ | ------ | ------ |
| 4 | 0.125 | 0.400 | 0.782 | 1.600 | ------ | ------ | ------ | ------ | ------ |
| 5 | 0.089 | 0.279 | 0.521 | 0.856 | 1.634 | ------ | ------ | ------ | ------ |
| 6 | 0.068 | 0.211 | 0.372 | 0.580 | 0.903 | 1.658 | ------ | ------ | ------ |
| 7 | 0.053 | 0.164 | 0.288 | 0.434 | 0.627 | 0.937 | 1.675 | ------ | ------ |
| 8 | 0.045 | 0.136 | 0.232 | 0.342 | 0.478 | 0.662 | 0.962 | 1.688 | ------ |
| 9 | 0.036 | 0.111 | 0.192 | 0.282 | 0.384 | 0.513 | 0.690 | 0.981 | 1.698 |

*Table III*

| $n$ | $a_1$ | $b_1$ | $a_2$ | $b_2$ | $a_3$ | $b_3$ |
|---|---|---|---|---|---|---|
| 1 | 2.000 | ------ | ------ | ------ | ------ | ------ |
| 2 | 2.414 | 0.414 | ------ | ------ | ------ | ------ |
| 3 | 2.524 | 0.733 | 0.208 | ------ | ------ | ------ |
| 4 | 2.574 | 0.868 | 0.426 | 0.132 | ------ | ------ |
| 5 | 2.605 | 0.946 | 0.539 | 0.291 | 0.093 | ------ |
| 6 | 2.623 | 0.994 | 0.610 | 0.384 | 0.216 | 0.071 |

What is claimed is:

1. A pulse shaping network having input and output terminals and constituted by a ladder type network, adapted to be inserted between an input resistance $R_1$ and an output resistance $R_2$, and comprising a total number $n$ of series inductances and shunt condensers, wherein the respective values of said inductances and of the capacities of said condensers are so dimensioned that in a periodic state with an angular frequency $\omega$, the ratio of the electromotive force or current applied at the input to said network to the current or voltage received at the output from said network is equal to the product of a constant factor by $$\left(1+\frac{p}{\sqrt{n}}\right)^n$$

designating by $p$ the product $j\omega\tau$, where $j$ is the imaginary unit and $\tau$ an arbitrarily chosen time constant.

2. A network as claimed in claim 1, comprising an odd number $n$ of elements and adapted to the case of an infinite output resistance, the input impedance $Z_{11}$, of which with its output terminals in open circuit is $$\frac{\left(1+\frac{p}{\sqrt{n}}\right)^n+\left(1-\frac{p}{\sqrt{n}}\right)^n}{\left(1+\frac{p}{\sqrt{n}}\right)^n-\left(1-\frac{p}{\sqrt{n}}\right)^n}(R_1)$$

the successive values of the elements of said network counted from said input terminals being obtained by developing the expression for $Z_{11}/R_1$ as a continuous fraction with respect to the variable $(p)$, the values of the capacities of the condensers being equal to the coefficients of $p$ of an odd rank in the development divided by $\omega_0R_1$ where $\omega_0=1/\tau$, and the values of the inductances being equal to the products of the coefficients of $p$ of an even rank in said development by $R_1/\omega_0$.

3. A network as claimed in claim 1 comprising an even number $n$ of elements and adapted to the case of an infinite output resistance $R_2$ the input impedance $Z_{11}$ of which with its output terminals in open circuit is:

$$\frac{\left(1+\frac{p}{\sqrt{n}}\right)^n+\left(1-\frac{p}{\sqrt{n}}\right)^n}{\left(1+\frac{p}{\sqrt{n}}\right)^n-\left(1-\frac{p}{\sqrt{n}}\right)^n}(R_1)$$

the successive values of the elements of said network counted from said input terminals being the expression $$\frac{\left(1+\frac{p}{\sqrt{n}}\right)^n+\left(1-\frac{p}{\sqrt{n}}\right)^n}{\left(1+\frac{p}{\sqrt{n}}\right)^n-\left(1-\frac{p}{\sqrt{n}}\right)^n}$$

developed as a continuous fraction with respect to the variable $p$, the values of the capacities of the condensers being the coefficients of $p$ of even ranks in said development divided by $\omega_0R_1$ where $\omega_0=1/\tau$ and the values of the inductances being the coefficients of $p$ of odd ranks in said development multiplied by $R_1/\omega_0$.

4. A network as claimed in claim 1 adapted to the case of an output resistance $R_2$ at least equal to the input resistance $R_1$, and comprising an odd number $n$ of elements, wherein, designating by $\lambda$ the quantity $$2\sqrt{R_1R_2}/(R_1+R_2)$$

by $\mu$ the quantity $$\sqrt[2]{\lambda^2}$$

by $\Delta$ the quantity $$\left(1-2\mu\cos\frac{2k\pi}{n}+\mu^2\right)$$

by $x$ the quantity $$\frac{p}{\sqrt{n}}$$

by $\theta_n(p)$ the quantity $$\left(1+\frac{p}{\sqrt{n}}\right)^n$$

and by $S_n(p)$ the quantity:

$$S_n(p)=(x+\sqrt{1-\mu})\prod_{k=1}^{\frac{n-1}{2}}\left[x^2+x\sqrt{2-2\mu\cos\frac{2k\pi}{n}+2\sqrt{\Delta}}+\sqrt{\Delta}\right]$$

and designating respectively by $S'_n(p)$, $\theta'_n(p)$, $S''_n(p)$, $\theta''_n(p)$ the odd and even portions of the polynomials $S_n(p)$ and $\theta_n(p)$ the values of the elements of said network are related by the expression $$\frac{\theta_n(p)+S'_n(p)}{\theta_n(p)\pm S''_n(p)}$$

the successive values of the elements of said network counted from said input terminals resulting in said expression developed into a continuous fraction with respect to the variable $p$, the values of the capacities of the condensers being the coefficients of $p$ of odd ranks in said development divided by $\omega_0R_1$ where $\omega_0=1/\tau$, and the values of the inductances being the coefficients of $p$ of even ranks in said development multiplied by $R_1/\omega_0$.

5. A network as claimed in claim 1, adapted to the case of an output resistance $R_2$ equal at least to the input impedance $R_1$, and comprising an odd number $n$ of elements, wherein, designating by $\lambda$ the quantity $$2\sqrt{R_1R_2}/(R_1-R_2)$$

by $\mu$ the quantity $$\sqrt[n]{\lambda 2}$$

by $\Delta$ the quantity $$\left(1-2\mu\cos\frac{2k}{n}+\mu^2\right)$$

by $x$ the quantity $$\frac{p}{\sqrt{n}}$$

by $\theta_n(p)$ the quantity $$\left(1+\frac{p}{\sqrt{n}}\right)^n$$

and by $S_n(p)$ the quantity:

$$(x-\sqrt{1-\mu})(x+\sqrt{1-\mu})\prod_{k=1}^{\frac{n-1}{2}}\left[x^2+x\sqrt{2-2\mu\cos\frac{2k\pi}{n}+2\sqrt{\Delta}}+\sqrt{\Delta}\right]$$

and designating respectively by $S'_n(p)$, $\theta_n(p)$, $S''_n(p)$ and $\theta''_n(p)$ the odd and even portions of the polynomials $S_n(p)$ and $\theta_n(p)$ the values of the elements of said network are related by the expression $$\frac{\theta_n(p)+S'_n(p)}{\theta''_n(p)\pm S''_n(p)}$$

the successive values of the elements of said network counted from said input terminals resulting in said expression developed into a continuous fraction with respect to the variable $p$, the values of the capacities of the condensers being the coefficients of $p$ of even ranks in said development divided by $\omega_0R_2$ where $\omega_0=1/\tau$ and the values of the inductances being the coefficients of $p$ of odd ranks in said development multiplied by $R_2/\omega_0$.

6. A network as claimed in claim 1 adapted to the case of an output resistance $R_2$ equal at least to the input resistance $R_1$, and comprising an even number $n$ of elements, wherein, designating by $\lambda$ the quantity $$2\sqrt{R_1R_2}/(R_1+R_2)$$

by $\mu$ the quantity $$\sqrt[n]{\lambda 2}$$

by $\Delta$ the quantity $$\left(1-2\mu\cos\frac{2k\pi}{n}+\mu^2\right)$$

by $x$ the quantity $$\frac{p}{\sqrt{n}}$$

by $\theta_n(p)$ the quantity $$\left(1+\frac{p}{\sqrt{n}}\right)^n$$

and by $S_n(p)$ the quantity:

$$(x+\sqrt{1-\mu})(x+\sqrt{1+\mu})\prod_{k=1}^{\frac{n}{2}-1}\left[x^2+x\sqrt{2-2\mu\cos\frac{2k\pi}{n}+2\sqrt{\Delta}+\sqrt{\Delta}}\right]$$

and by designating respectively the $S'_n(p)$, $\theta'_n(p)$, $S''_n(p)$, $\theta''_n(p)$ the odd and even portions of the polynomials $S_n(p)$ and $\theta_n(p)$ the values of the elements of said network are related by the expression $$\frac{\theta''_n(p)+S''_n(p)}{\theta'_n(p)\pm S'_n(p)}$$

the successive values of the elements of said network counted from said input terminals resulting in said expression developed into a continuous fraction with respect to the variable $p$, and the values of the capacities of the condensers being the coefficients of $p$ of even ranks in said development divided by $\omega_0 R_1$ where $\omega_0=1/\tau$ and the values of the inductances being the coefficients of $p$ of odd ranks in said development multiplied by $R_1/\omega_0$.

7. A network as claimed in claim 1 adapted to the case of an output resistance $R_2$ equal at least to the input resistance $R_1$, and comprising even number $n$ of elements, wherein, designating by $\lambda$ the quantity $$2\sqrt{R_1R_2}/(R_1+R_2)$$

by $\mu$ the quantity $$\sqrt[n]{\lambda 2}$$

by $\Delta$ the quantity $$\left(1-2\mu\cos\frac{2k\pi}{n}+\mu^2\right)$$

by $x$ the quantity $$\frac{p}{\sqrt{n}}$$

by $\theta_n(p)$ the quantity $$\left(1+\frac{p}{\sqrt{n}}\right)^n$$

and by $S_n(p)$ the quantity $$(x+\sqrt{1+\mu})(x+\sqrt{1+\mu})\prod_{k=1}^{\frac{n}{2}-1}\left[x^2+x\sqrt{2-2\mu\cos\frac{2k\pi}{n}+\sqrt{\Delta}+\sqrt{\Delta}}\right]$$

and designating respectively by $S'_n(p)$, $\theta'_n(p)$, $S''_n(p)$ and $\theta''_n(p)$ the odd and even portions of the polynomials $S_n(p)$ and $\theta_n(p)$ the values of the elements of said network are related in the expression $$\frac{\theta''_n(p)+S''_n(p)}{\theta'_n(p)\pm S'_n(p)}$$

the successive values of the elements of said network counted being from said input terminals resulting in said expression developed into a continuous fraction with respect to the variable $p$, the values of the capacities of the condensers being the coefficients of $p$ of odd ranks in said development divided by $\omega_0 R_2$ where $\omega_0=1/\tau$ and the values of the inductances being the coefficients of $p$ of even ranks in said development multiplied by $R_2/\omega_0$.

References Cited in the file of this patent

UNITED STATES PATENTS

| | | |
|---|---|---|
| 1,571,458 | Pupin | Feb. 2, 1926 |
| 1,712,603 | Hoyt | May 21, 1929 |